(12) United States Patent
Suzuki et al.

(10) Patent No.: US 6,951,340 B2
(45) Date of Patent: Oct. 4, 2005

(54) GASKETS FOR SUBSTRATE CONTAINERS

(75) Inventors: Tsutomu Suzuki, Tokyo (JP); Chiho Seki, Saitama-ken (JP); Hideo Kudo, Fukushima-ken (JP); Takashi Matsuo, Fukushima-ken (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 20 days.

(21) Appl. No.: 10/415,296

(22) PCT Filed: Sep. 30, 2002

(86) PCT No.: PCT/JP02/10160

§ 371 (c)(1),
(2), (4) Date: Apr. 28, 2003

(87) PCT Pub. No.: WO03/033377

PCT Pub. Date: Apr. 24, 2003

(65) Prior Publication Data

US 2004/0041355 A1 Mar. 4, 2004

(30) Foreign Application Priority Data

Oct. 12, 2001 (JP) ........................................ 2001-314708

(51) Int. Cl.⁷ ................................................ F16J 15/08
(52) U.S. Cl. ...................................... 277/650; 428/35.7
(58) Field of Search .......................... 277/650; 428/35.7

(56) References Cited

FOREIGN PATENT DOCUMENTS

| GB | 2250024 A | * 5/1992 | .............. C08J/5/00 |
|----|-----------|----------|------------------------|
| JP | 53056252 A | * 5/1978 | ........... C08L/67/02 |
| JP | 10-279705 | 10/1998 | |
| JP | 2000-43976 | 2/2000 | |
| JP | 2001-259032 | 9/2001 | |

* cited by examiner

Primary Examiner—Sandra M. Nolan-Rayford
(74) Attorney, Agent, or Firm—Wenderoth, Lind & Ponack, L.L.P.

(57) ABSTRACT

Provided are a gasket member for a substrate-holding container which is little liable to contamination of the substrate materials contained with organic matters due to the low content of organic matters to be emitted as a gas still without decreasing the operability in opening and closing of the covering as well as a substrate-holding container by using the same. The gasket member for a substrate-holding container provided is formed from a thermoplastic polyester-based elastomer resin containing absolutely no softening agent and having a surface hardness not exceeding 80A by the hardness testing method specified in JIS K6301, of which the amount of gas emission as determined under heating conditions for 60 minutes at 80° C. does not exceed 10 ppm based on the weight of the material. Disclosure is given of a polyester-based block copolymer suitable as a molding material of the said gasket member.

2 Claims, 3 Drawing Sheets

F I G. 2
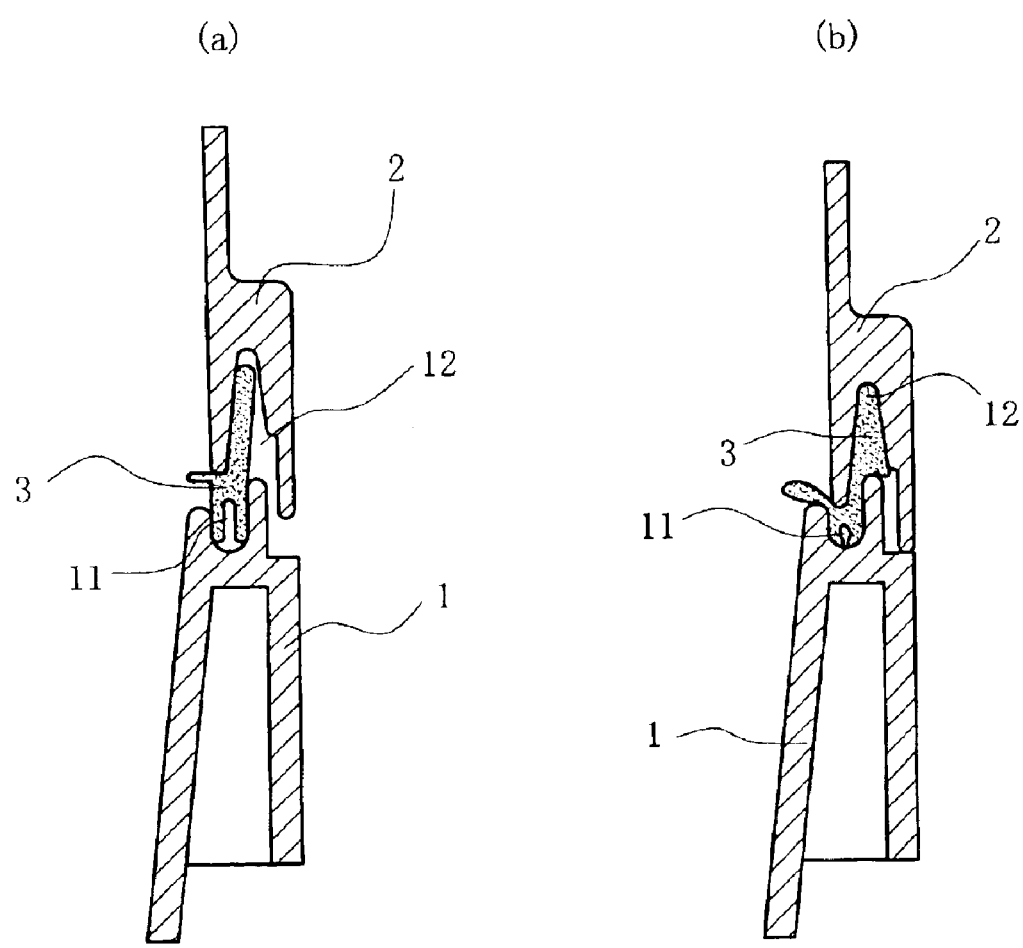

GASKETS FOR SUBSTRATE CONTAINERS

TECHNOLOGICAL FIELD

The present invention relates to a gasket member used in a substrate-holding container to be used in transportation and safekeeping of substrate materials such as semiconductor wafers, glass plates for photomasks and others.

BACKGROUND TECHNOLOGY

As to the substrate-holding container for use in transportation and safekeeping of substrates, there are known and rendered to actual use, heretofore, substrate-holding containers, as described in the official publication of Japanese Utility Model Kokai No. 1-51058, constituted of a carrier having holding grooves to support a plurality of substrates at oppositely facing positions, a body of the substrate-holding container to hold the same and a covering capable of being opened and closed as fittingly engaged with the body of the substrate-holding container along the outer periphery thereof as well as presser members to stably fix the substrates, a gasket member held by sandwiching between the body of the substrate-holding container and the covering around the outer peripheries thereof, and others.

In these substrate-holding containers, there are used, heretofore, synthetic resinous materials such as, for example, polypropylene, polyethylene, polycarbonate, polybutylene terephthalate and the like in respect of their good balance of lightness in weight, moldability and so on in accordance with the requirements for properties of the respective constituent parts.

Among these constituent parts, the gasket member is, usually, held by sandwiching within the fitting-engagement space between the body of the substrate-holding container and the covering around the outer peripheries and serves to isolate the inside and outside ambiences of the substrate-holding container by the resilient compression due to fitting engagement of the body of the substrate-holding container and the covering so as to prevent intrusion of contaminant substances of mainly particles from outside of the substrate-holding container during safekeeping or transportation. Furthermore, advantageous effects can be obtained by the gasket member that, in transportation on an aircraft, pressure changes within the substrate-holding container due to changes of the external pressure can be mitigated consequently preventing intrusion of particles into the substrate-holding container and movement of particles in the substrate-holding container due to movement of the air flow so as to decrease contamination of the substrates contained.

As is described above, the gasket member is required to have properties that it is deformed by elastic compression thereby to assuredly keep the air-tight sealed condition but still regains the original shape when the pressure is removed by opening the covering so that it should essentially have appropriate rubber elasticity and surface hardness. As a material to satisfy the requirement for the surface hardness, there have been used heretofore those thermoplastic elastomer materials f relatively high flexibility by compounding a polystyrene, polyolefin and the like as the base resin with an external softening agent such as a paraffin oil as a typical one in order to adjust the surface hardness thereof.

These softening agents, however, generally never form chemical bondings with the base resin but are in a condition of mere physical blending so that they are liable to cause bleeding to the surface or emission of gaseous organic matters by dissipation, vaporization and so on due to various factors encountered in the molding conditions and use ambience of the gasket. An issue coming up as a problem is that degradation of the resinous material used as the base resin not only causes enhancement of the above possibility but also increases the emitted amount of the gases generated from the material per se consequently resulting in an influence of contamination occurring on the substrates caused by these organic matters.

In view of the situations as above, the problem in the present invention is to provide a gasket member for substrate-holding containers, with a principal target being to decrease contamination of the substrate materials contained by organic matters as low as possible with little dissipation and emission of organic matters, which has flexibility sufficient to ensure sealability of the substrate-holding container without decreasing the operability of the covering in opening and closing.

DISCLOSURE OF INVENTION

The gasket member for a substrate-holding container of the present invention has a surface hardness not exceeding 80A by the Type A spring hardness testing method of JIS K6301 and is formed from a thermoplastic polyester-based elastomer resin containing absolutely no softening agent, of which the amount of gaseous emission does not exceed 10 ppm based on the weight of the material as determined by the dynamic head space method under heating conditions of 80° C. and 60 minutes. The present invention further provides a substrate-holding container with mounting of such a gasket member.

BRIEF DESCRIPTION OF THE DRAWING

FIG. 2 is a partial cross sectional view showing the relative disposition of the gasket member of the present invention, the body of a substrate-holding container and a covering. FIG. 2(a) shows the state before closing the covering and FIG. 2(b) shows the state having the covering closed.

BEST MODE FOR PRACTICING THE INVENTION

Figure 1:
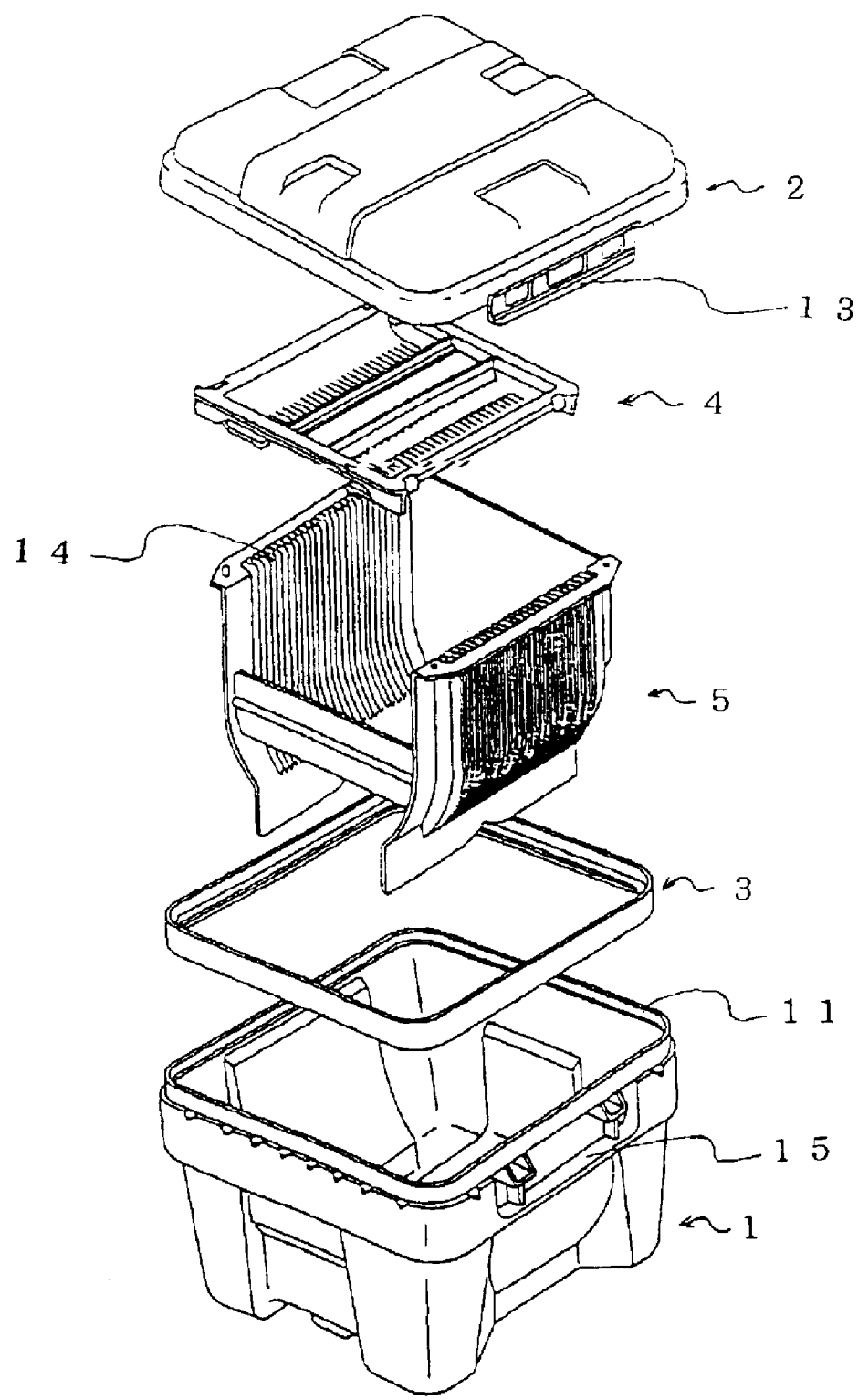
FIG. 1 is a disassembling perspective view illustrating a substrate-holding container in which the gasket member of the present invention is used.

Firstly, a description is given of the substrate-holding container, in which the gasket member of the present invention is employed, by using FIG. 1 and FIG. 2.

FIG. 1 is a disassembling perspective view showing a substrate-holding container in which the gasket member of the present invention is employed. FIG. 2 is a partial cross sectional view showing the relative disposition of the gasket member of the present invention and the body and covering of a substrate-holding container, of which FIG. 2(a) shows the state before closing the covering and FIG. 2(b) shows the state with the covering closed.

As is shown in FIG. 1, substrates (not shown in the figure) are mounted on and held by a carrier 5 fittingly disposed within the body 1 of the substrate-holding container and a covering 2 is fittingly mounted thereon. Firstly then, cushioning of the substrate-presser members 4 fittingly disposed on the inward surface of the covering 2 come into contact with the upper peripheral parts of the substrates contained and, upon further thrusting of the covering 2 toward the substrates, the substrates are brought into press-fixing by the individual springy parts of the cushioning in contact with the respective substrates with stretching or contraction to exhibit resilient force corresponding to the number of the substrates contained.

Subsequently, after contacting of the circumferential part of the covering 2 to the gasket member 3 disposed within a gasket groove 11 along the circumference of the body 1 of the substrate-holding container, the still lasting resilient force of the cushioning is enhanced by the addition of the compressive force of the gasket member 3 to cause progress by a distance corresponding to the compression stroke of the gasket member 3 finally leading to completion of covering closure by working of the hook 13 onto the engagement stopper 15.

The procedure of covering opening is reverse to the above. Namely, when the hook 13 is disengaged from the engagement stopper 15, the compressive force of the gasket member 3 is released so as to open the covering 2 under combined action of the reaction force in the cushioning of the substrate-presser members 4.

To give a description in further detail, the substrate-holding container in which the aforementioned gasket member 3 is employed consists of a case-formed carrier 5 provided with a plurality of parallel line protrusions in a pleats-like fashion as substrate-holding ribs 14 capable of arranging and supporting a plurality of substrates for semiconductor devices (not shown in the figure) at regular intervals and substrate-holding grooves in the form of a groove having a V-cross section formed between the said substrate-holding ribs 14,14, a body 1 of the substrate-holding container for containing the carrier 5 having gasket grooves 11 for containing the aforementioned gasket members along the outer circumference of the opening and a set of oppositely facing engagement stoppers 15 outside for being fixedly engaged with the hooks 13 of the covering, a covering 2 having a pair of oppositely facing hooks 13 on the side surfaces capable of further being fixedly engaged with the engagement stoppers 15 of the body 1 of the said substrate-holding container and substrate-presser members 4 having comb grooves which are fittingly mounted onto the inner surface of the said covering 2 and capable of individually and resiliently holding the respective substrates contained in the carrier 5 at a part of the outer peripheries.

In FIG. 2, the gasket member 3 is disposed between the gasket groove 11 provided along the outer circumference of the open part of the body 1 of the substrate-holding container and the gasket groove 12 provided along the outer circumference of the covering 2 oppositely facing the body 1 of the substrate-holding container (FIG. 2(a)) and, as the covering becomes closed, the gasket member 3 is sandwich-held in a compressively deformed condition between the body 1 of the substrate-holding container and the covering 2 (FIG. 2(b)).

While the assembling procedure of the substrate-holding container by bringing the covering and the body on the substrate-holding container into fixed engagement where substrates are contained within the substrate-holding container including the gasket member or inversely the unsealing procedure of the same is undertaken by an automatic machine or manually, the operability in assembling and unsealing there is mainly under influences of the manner of fixed engagement of the covering and the body and the fastening force required for fixed engagement (or the force required for unsealing as a reaction force thereto).

The former is correlated to the mechanism of hook/engagement stopper and the position and number thereof and the latter is correlated to two members, of which one is the compressive force of the gasket member depending on their form and material characteristics and the other is the substrate-pressing force (spring force) depending on the forms and material characteristics of the cushioning of the presser members having a shock-absorbing function in contact with the substrates within the substrate-holding container, and the fastening force of the substrate-holding container as a whole is consequently equal to the gross summation thereof.

In this way, the fastening force of the substrate-holding container consists of the summation of the substrate-pressing force of the cushioning in the presser members and the compressive force of the gasket member. With regard to the cushioning of the presser members, designing is made by presetting the cushioning force indispensable for protection of the substrates from shocks and vibrations. It is desirable from the standpoint of operability in opening and closing of the substrate-holding container that the compressive force of the gasket member occupying in the overall fastening force of the substrate-holding container is small as compared with that of the cushioning of the presser members.

Assuming that the compressive force on the gasket member, as an approximation, consists of the product of the compression stroke required for sealing of the substrate-holding container and the rubber elasticity, it is necessary either to decrease the compression stroke or to decrease the rubber elasticity in order to decrease the compressive force. An extreme decrease of the stroke results in a tendency of unstable sealability performance due to non-uniformity and incompleteness of the contacting surface between the gasket member and the covering or body so that it is essential that an adequate stroke can be ensured necessitating selection of the rubber elasticity (hardness) of an appropriate material.

Since an increase in the diameter of the substrates results in a corresponding increase in the cushioning force, in particular, the necessity is increased of the selection of an optimum value for the compressive stress of the gasket member or, namely, the material hardness in order to keep the same within a range of practical operability.

For the reasons as above, though dependent on the sizes and forms of the substrates to be contained, it has been the case heretofore that selection of the hardness of the material used in the gasket members is empirically made for a material having a surface hardness not exceeding 80A or, in particular, not exceeding 70A as determined by the typ A spring hardness testing method according to JIS K6301 for the gasket members in the substrate-holding containers to be used for substrates having a diameter up to 200 mm (8 inches) heretofore. As the materials to satisfy the surface hardness, polystyrenes, polyolefins and the like are used heretofore as the base resin. In these materials, however, it is impossible to obtain a hardness not exceeding 80A with the base resin alone so that it is indispensable in order to modify the hardness thereof that an external softening agent, of which a paraffin oil is a first-named example, is compounded.

In the present invention, the target is to obtain a material having a surface hardness not exceeding 80A or, preferably, not exceeding 70A and, for substrates of a still larger diameter, for example, in the case of a diameter of 300 mm (12 inches), a material, preferably, not exceeding about 60A, absolutely without containing any external softening agents.

Although the thermoplastic elastomer used for the gasket member is never in direct contact with the substrates, it is used under sealing conditions and, as is described before, a change in the external pressure causes a movement of the inner and outer air of the substrate-holding container along the surface of the gasket member so that the organic matter vaporized from the gasket member per se has a very great influence on the contamination of the substrates by organic substances. Along with the trend toward higher densities of integration in semiconductor devices, even a still smaller amount of organic matters than before is now taken as a problem.

Along with the development of analytical technologies in recent years, in particular, quantitative determination can now be performed with good accuracy for the amount of gaseous emission from a resinous material by the dynamic head space method and it has now become understood that, when the amount of gaseous emission of organic matters vaporized from a gasket member exceeds 10 ppm based on the weight of the material as determined by collecting under a stream of an inert gas in a heating condition of 60 minutes at 80° C., the amount of deposition of organic matters is increased on the substrate surface giving rise to contamination of the substrate surface and adversely influencing unacceptable properties and yield of acceptable products of the devices manufactured therefrom.

There are known heretofore, as the thermoplastic polyester-based elastomer, those consisting of an aromatic polyester resin as a crystalline hard constituent (segments) of high melting point and an aliphatic polyether, aliphatic polyester and the like as a non-crystalline soft constituent (segments) of low melting point.

The inventors have arrived at a discovery that, by compounding the aforementioned hard constituent and the soft constituent of a thermoplastic polyester-based elastomer as combined in an appropriate proportion, it is possible to obtain a gasket member containing absolutely no softening agents of which the surface hardness has a value very desirable for use in a substrate-holding container leading to development of a gasket member of which the amount of gaseous emission is small relative to the organic matter vaporized from the gasket member and which exhibits satisfactory operability in mounting and de-mounting of the covering onto and from the body of the container as well as a substrate-holding container using the same.

Namely, the material of the gasket member of the present invention consists of a thermoplastic polyester-based elastomer which absolutely does not contain any one of various plasticizers such as paraffin oils, di(2-ethylhexyl) phthalate (DOP), dibutyl phthalate (DBP), diheptyl phthalate (DHP) and the like, or softening agents including rubbery materials such as butadiene, EPDM rubbers, natural rubber and others.

It is preferable that the thermoplastic elastomer to be the material of a gasket member of the present invention is a block copolymer consisting of the hard constituent and the soft constituent.

The aforementioned hard constituent is exemplified by polyesters formed from aromatic dicarboxylic acid residues and diol residues, copolyesters consisting of a combination of two kinds or more thereof, copolymeric polyesters by further combining other oxyacids, and the like, of which polybutyleneterephthalates are particularly preferable. Besides, these hard constituent segments are not particularly limitative relative to the average molecular weight.

On the other hand, the soft constituent is exemplified by polyetherglycols and mixtures thereof, copolymeric polyetherglycols and aliphatic polyesters and their copolymeric polyesters, of which polyoxytetramethyleneglycols are particularly preferable. It is preferable that these soft constituent segments have an average molecular weight in the range from 400 to 10000.

With respect to the compositional proportion of the two constituents in the polyester elastomers, it is possible to obtain a gasket member formed from a polyester elastomer having a hardness not exceeding 80A absolutely without using any external softening agents or plasticizers such as liquid paraffins by adequately controlling, depending on the form of the gasket member, the weight proportion of the hard constituent/soft constituent in the range from 3:97 to 95:5 or, more preferably, in the range from 4:1 to 3:1.

With respect to the compounding composition of the molding material for the gasket members, it is optional according to need to admix various kinds of stabilizers including antioxidants, ultraviolet absorbers and the like, coloring agents, processing aids, antistatic agents and others.

With respect to the amount of gaseous emission, the amount of generation thereof can be decreased by undertaking a method including, for example, a degassing treatment in the manufacturing steps of the polyester elastomer resin such as vacuum heating of the resin material before molding (pellets) and a treatment in the molding step of the gasket such as vacuum deaeration during the injection or extrusion, holding in the cylinder part or pellet-feeding part of the extruder machine as well as a heat treatment of the gasket as molded.

Figure 3:
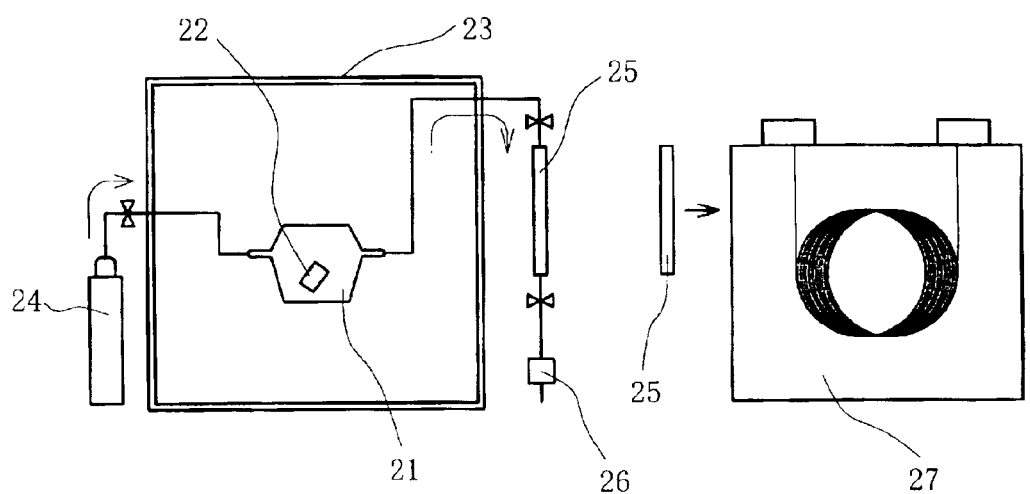
FIG. 3 is a schematic illustration describing the principle of the dynamic head space method for collection of gases emitted from a sample and an apparatus for gas analysis by using the method.

The dynamic head space method applied to testing of the gasket member of the present invention is one of the methods in which the gases generated from the test specimen are introduced into an analytical apparatus. As is shown in FIG. 3, a sample piece 22 as cut in an appropriate size is first taken in a chamber 21, the chamber 21 is held in an oven 23 under heating at a specified temperature and the gas emitted from the sample piece 22 is continuously introduced under stream of a carrier gas 24 such as helium, nitrogen and the like into a collector tube 25 (an aspirator 26 is sometimes used). The collector tube 25 contains an adsorbent such as porous polymer beads, active carbon and the like so that the gas generated from the sample 22 is concentrated and collected by the adsorbent for a specified length of time. Thereafter, in the method, the collector tube 25 is dismounted and heated and the gas desorbed from the adsorbent is injected into a gas chromatographic-mass spectrometric analytical instrument (referred to as GC-MS hereinafter) to determine the amount of the organic materials generated from the sample (amount of gaseous emission). As to the quantitative determination of the amount of vaporizable organic materials, a calibration curve is prepared in advance between the amount of organic materials and the integral value of the peak on a recording chart by conducting measurements for standard solutions of n-decane and the amount of the vaporizable organic materials is obtained from this calibration curve.

In the Examples and Comparative Examples of the present invention, testing was undertaken for the following items.

With respect to the amount of gaseous emission emitted from the gasket member per se, a sample piece of about 0.1 g was taken from the gasket member as molded and a quantitative determination was conducted by the dynamic head space method using a GC-MS analytical instrument for the overall amount of the emitted gases as generated and collected in a stream of helium gas under heating conditions of 80° C. and 60 minutes making reference to n-decane for conversion.

With respect to the organic contamination of a substrate, a substrate-holding container for transportation of 200 mm silicon wafers mentioned before was assembled by using a gasket member and a single silicon wafer after cleaning was held inside and kept for 10 days at room temperature followed by determination of the overall amount of the organic matter deposited on the wafer surface by using a commercially available analyzer for organic matter on substrate surface SWA-256 (manufactured by G.L. Science Co.) as calculated by making reference to hexadecane.

The testing method for the sealability performance of the gasket member is as follows.

Figure 4:
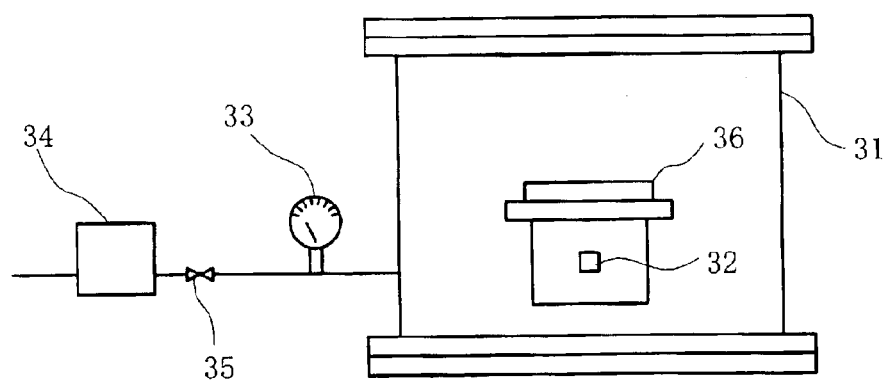
FIG. 4 is a schematic illustration showing an apparatus for determination of the sealability performance of a substrate-holding container.

As is shown in FIG. 4, a telemetering pressure gauge (pressure sensor) 32 is installed within a substrate-holding container 36 assembled by using the gasket member and this substrate-holding container 36 is set in a stainless steel-made pressurizable vessel 31 which is connected to a vacuum pump 34 by way of a pressure-resistant piping through a pressure gauge 33 for measurement of the pressure inside of the pressurizable vessel 31 and pressure-regulator valve 35 for control of the pressure inside of the pressurizable vessel 31.

While the pressure inside of the pressurizable vessel 31 is decreasing by operating the vacuum pump 34, operation of the vacuum pump 34 is terminated at a moment when the pressure gauge 33 indicates −29.42 kPa after lapse of an appropriate time or, for example, about 2 minutes for the operation of the vacuum pump 34.

In this case, the pressure inside of the substrate-holding container 36 is in a condition of high pressure relative to the pressure outside of the substrate-holding container or, namely, inside of the pressurizable vessel 31 but, with the lapse of time depending on the sealability performance of the gasket, the air inside of the substrate-holding container 36 gradually leaks out to the outside of the substrate-holding container 36 to cause a drop of the pressure so as to become finally balanced with the pressure outside of the substrate-holding container 36 or, namely, of the pressurizable vessel 31. If the gasket member totally fails to exhibit sealability performance, the pressure inside of the substrate-holding container behaves in concurrent changes with the changes of the pressure outside of the substrate-holding container or, namely, inside of the pressurizable vessel. Evaluation of the sealability performance is made for the pressurized condition inside of the substrate-holding container by measuring the time taken until the pressures inside and outside of the substrate-holding container become balanced.

Inversely, it is also possible that, by bringing the pressure inside of the pressurizable vessel to a high pressure so that the pressure inside of the substrate-holding container is a lower pressure than the pressure outside of the substrate-holding container or, namely, inside of the pressurizable vessel, evaluation is made by taking the time required, after decreasing of the pressure difference with the lapse of time, until the two pressures become finally balanced as the sealability for a reduced-pressure condition inside of the substrate-holding container.

If the gasket member totally fails to exhibit sealability or is deficient in the sealability here, the change rate for the pressure changes inside of the substrate-holding container becomes great within a short time following the pressure changes outside resulting in disturbance of the air flow in the substrate-holding container to increase the possibility of imparting adverse influences on the cleanness of the substrates contained.

If the sealability is excessively high, it is sometimes the case that, in the transportation on an airplane or so, the pressure inside of the substrate-holding container remains a lower pressure than outside or a reduced-pressure condition even after lapse of a long time following arrival at the destination of transportation to cause difficulties in opening of the covering.

It is therefore an empirical knowledge that, in each of the cases of a higher pressure and lower pressure of the pressure inside of the substrate-holding container than the external pressure, the length of time taken until the inside pressure of the substrate-holding container becomes balanced with the external pressure of the container is desirably about 60 minutes at the longest but is not about 10 minutes or shorter at the shortest.

In the following, the present invention is described in more detail by way of Examples and Comparative Examples but the present invention is never limited to the Examples and so on described here.

EXAMPLE 1

Taking dimethyl terephthalate, 1,4-butanediol and polytetramethyleneglycol as the starting reactants, a reaction mixture with admixture of tetrabutyl titanate as a catalyst and a phenolic antioxidant (1,3,5-trimethyl-2,4,6-tris(3,5-di-tert-butyl-4-hydroxybenzyl benzene) as a stabilizer, respectively, was heated to effect an ester-exchange reaction followed by a polycondensation reaction in a vacuum polymerization reactor to obtain a block copolymer of 63A JIS hardness consisting of polybutyleneterephthalate as the hard constituent and polytetramethyleneglycol having an average molecular weight of about 3000 as the soft constituent in a weight proportion of 3:1.

This polymerizate was extruded by using a double-screw extruder machine of 30 mm screw diameter to be pelletized followed by vacuum drying of the same at 100° C. for 8 hours in a vacuum dryer to give pellets for molding.

In order to conduct evaluation relative to the amount of gaseous emission generated from the gasket member, operability of the gasket member, sealability performance when a substrate-holding container was assembled and contamination with organic matters on the substrates contained, a gasket member in a container for holding silicon wafers of 200 mm diameter as shown in FIG. 1 and FIG. 2 was prepared under conventional conditions of injection molding by using the pellets for molding obtained as aforementioned.

The amount of gaseous emission from the thus obtained gasket member was 1.8 ppm (weight as converted to n-decane).

All of the resinous materials used for the carrier, body of the substrate-holding container, covering and substrate pressers prepared for testing purpose were each a synthetic resin material suitable for use as a substrate-holding container satisfying the requirements for low gas emission, low contamination by solubilized metals and ions and mechanical properties. To say particularly, a polypropylene, polypropylene, polycarbonate and polyester-based elastomer, respectively, were used as the molding materials to conduct molding by injection molding under appropriate conditions.

By using the thus obtained gasket member, a substrate-holding container for transportation of 200 mm silicon wafers was assembled and a silicon wafer after cleaning was contained therein and kept stored for 10 days at room temperature followed by determination of the overall amount of organic matters deposited on the surface of the substrate as converted to hexadecane by using the aforementioned organic matter analyzer on substrate surface SWA-256 to find 1.4 ng/cm². This value indicated a very small increase over the contamination amount of 1.1 ng/cm² obtained by the measurement conducted under the identical conditions for the same substrate-holding container except that the said gasket member was not used for comparison.

In order to make evaluation of operability in opening and closing of the covering, the aforementioned gasket member was inserted into the gasket-holding groove around the outer periphery of the open part in the body of the substrate-holding container, the covering was put thereon from above and measurement was carried out for the push-down force required when the hooks on the side surfaces of the covering were brought into engagement with the engagement stoppers on the body of the substrate-holding container to find that the operability was very satisfactory so that reliable engagement could be easily accomplished with the engagement stoppers on the body of the substrate-holding container only by gently pushing down the hooks on both sides of the covering with the palms of both hands.

The inside pressure of the substrate-holding container exhibited a behavior of slow decreasing as compared with the change in the outside pressure of the substrate-holding container (inside pressure of the pressurizable vessel) (2 minutes taken for reaching −0.3 kg/cm²) taking about 15 minutes until finally reaching the same pressure of −29.42 kPa as the outside of the substrate-holding container to find that the sealability was satisfactory for a pressurized condition in the outside of the substrate-holding container.

Following the above-mentioned testing, the inside pressure of the pressurizable vessel was returned to normal pressure taking about 1 minute from the reduced-pressure condition of −29.42 kPa in each of the pressures inside of the substrate-holding container and inside of the pressurizable vessel by releasing the valve connected to the pressure-resistant piping to the atmospheric pressure.

The inside pressure of the substrate-holding container reached normal pressure after about 10 minutes from the moment when the outside pressure of the substrate-holding container (inside pressure of the pressurizable vessel) had returned to normal pressure to exhibit a behavior of delayed gradual decreasing in the pressure difference relative to the changes in the outside pressure of the substrate-holding container. A time of about 10 minutes was taken until the same pressure as the outside of the substrate-holding container (normal pressure) was finally reached so that the sealability was found satisfactory for a reduced-pressure condition inside of the substrate-holding container.

These results are shown in Table 1. The results in Example 2 and Comparative Examples 1 and 2 are also shown in Table 1.

TABLE 1

|  | Example | | Comparative Example | |
| --- | --- | --- | --- | --- |
|  | 1 | 2 | 1 | 2 |
| Hard constituent H | polybutyleneterephthalate | | | |
| Soft constituent S | polytetramethyleneglycol | | | |
| H/S composition ratio | 3/1 | 4/1 | 5/1 | 5/1 |

TABLE 1-continued

|  | Example | | Comparative Example | |
| --- | --- | --- | --- | --- |
|  | 1 | 2 | 1 | 2 |
| Softening agent (weight proportion %) | no | no | no | liquid paraffin 20 |
| Vacuum drying treatment of molding materials | yes | no | yes | yes |
| Vacuum drying treatment of products | no | yes | no | no |
| Hardness | 63A | 70A | 89A | 70A |
| Operability of covering | good | good | poor | good |
| Sealability/pressurized (minutes) | 15 | 11 | no | 10 |
| Sealability/pressure-reduced (minutes) | 10 | 8 | no | 7 |
| Amount of gas emission (ppm) | 1.8 | 2.6 | 2.0 | 24.0 |
| Organic contamination of substrate (ng/cm²) | 1.4 | 1.6 | 1.8 | 5.1 |

EXAMPLE 2

The ester-exchange reaction and the polycondensation reaction were carried out in the same manner as in Example 1 excepting for the modification in the compounding proportions of dimethyl terephthalate, 1,4-butanediol and polytetramethyleneglycol and omission of the vacuum heating treatment in the stage of pellets to obtain pellets for molding consisting of a block copolymer of JIS hardness 70A of which the hard constituent was a polybutyleneterephthalate and the soft constituent was a polytetramethyleneglycol having an average molecular weight of about 2000 in their composition ratio of 4:1.

By using the thus obtained pellets for molding, a gasket member of the same form as in Example 1 was shaped by molding, which was subjected to a heating treatment for 4 hours in a heating oven at 60° C.

The same evaluation tests as in Example 1 were undertaken with the thus obtained gasket member to find that the amount of gaseous emission generated from the molded article and the overall amount of the organic matter deposited onto the substrate surface were 2.6 ppm and 1.6 ng/cm², respectively.

The operability in opening and closing of the covering was satisfactory and, as to the sealability performance, satisfactory results of measurement of about 11 minutes and 8 minutes were obtained for the pressurized condition and for the reduced-pressure condition, respectively, of the inside of the substrate-holding container.

COMPARATIVE EXAMPLE 1

The ester-exchange reaction and the polycondensation reaction were carried out in the same manner as in Example 1 excepting for the modification in the compounding proportions of dimethyl terephthalate, 1,4-butanediol and polytetramethyleneglycol to obtain pellets of a block copolymer of JIS hardness 89A, of which the hard constituent was a polybutyleneterephthalate and the soft constituent was a polytetramethyleneglycol having an average molecular weight of about 1000 in their composition ratio of 5:1 and they were subjected to vacuum drying for 8 hours at 100° C. in a vacuum dryer into pellets for molding from which a gasket member was prepared by injection molding.

The same evaluation tests as in Example 1 were undertaken with the thus obtained gasket member to find that the amount of gaseous emission generated from the gasket member and the overall amount of the organic matter deposited onto the substrate surface were 2.0 ppm and 1.8 ng/cm$^2$, respectively.

As to the operability in opening and closing of the covering, closing of the covering required a pushing-down force of such an extent that both arms were put on the respective end portions of the hooks in the covering to lay down the upper part of the body thereon. Opening of this covering also required a force almost about twice as compared with Example 1 so that the operability in opening and closing of the covering was found poor.

With respect to the sealability performance, a non-uniform contacting condition of the gasket was produced to the outer circumference of the covering when the covering was closed to form a leaking channel resulting in substantial lack of the sealing function required for a gasket because of the too short follow-up time to the changes in the outside pressure for both of the pressurized and reduced-pressure conditions.

COMPARATIVE EXAMPLE 2

In the same manner as in Example 1, a starting mixture of dimethyl terephthalate, 1,4-butanediol and polytetramethyleneglycol was subjected to the ester-exchange reaction and polycondensation reaction to give a block copolymer of JIS hardness 89A of which the hard constituent was polybutyleneterephthalate and the soft constituent was polytetramethyleneglycol having an average molecular weight of about 1000 in a composition proportion of 5:1. With an object to control the hardness, the copolymer was admixed with a liquid paraffin (JIS #4) as a softening agent in a weight proportion of 20% and pellets were prepared in an extruder machine, which were subjected to vacuum drying in a vacuum drier at 100° C. for 8 hours to give a molding material having JIS hardness 70A. A gasket member was prepared by injection molding using this molding material.

This gasket member was subjected to the same evaluation tests as in the preceding Examples to find that, notwithstanding the use of a molding material after the vacuum drying treatment, the amount of gases emitted from the gasket member and the overall amount of organic matter deposited on the substrate surface exhibited high values of 24.0 ppm and 5.1 ng/cm$^2$, respectively, leading to a result that there could be contamination of the substrate.

The substrate-holding container assembled by using this gasket member exhibited good operability in opening and closing of the covering and the result of the testing on the sealability performance was generally satisfactory with about 10 minutes and 7 minutes for the pressurized condition and reduced-pressure condition, respectively, in the substrate-holding container.

UTILIZABILITY IN INDUSTRY

By using a gasket member formed from a polyester-based elastomer resin containing absolutely no softening agent, of which the surface hardness (by the type A spring hardness testing method of JIS K6301) does not exceed 80A and the amount of gas emission determined by the dynamic head space method under heating conditions of 60 minutes at 80° C. does not exceed 10 ppm, in a substrate-holding container, it is possible to reduce contamination of the substrate contained with organic matters while sealability of the substrate-holding container and the operability of covering can be ensured. While retaining sufficient flexibility for a gasket member, the gasket member of the present invention is satisfactory as a gasket member to be used in a substrate-holding container to contain substrate materials for devices of high density and high degree of integration for which particularly high cleanness is essential.

What is claimed is:

1. A gasket member for a substrate-holding container formed from a thermoplastic polyester-based elastomer resin containing absolutely no softening agent, of which the surface hardness according to JIS K6301 does not exceed 80A and the amount of gas emission does not exceed 10 ppm based on the weight of the material when heated for 60 minutes at 80° C. wherein the aforementioned thermoplastic polyester-based elastomer resin is a block copolymer consisting of polybutyleneterephthalate as a hard constituent and polytetramethyleneglycol as a soft constituent, the composition weight proportion of said hard constituent to said soft constituent being in the range from 4:1 to 3:1.

2. A substrate-holding container comprising a body of the container, a covering body and a gasket member, which is described in claim 1, said gasket member sandwiched between said body of the container and said covering body.

* * * * *